United States Patent
Ashida et al.

(10) Patent No.: US 9,817,105 B2
(45) Date of Patent: Nov. 14, 2017

(54) STACKED WAVEGUIDE SUBSTRATE, RADIO COMMUNICATION MODULE, AND RADAR SYSTEM

(71) Applicant: FUJITSU LIMITED, Kawasaki-shi, Kanagawa (JP)

(72) Inventors: Hiroshi Ashida, Fujisawa (JP); Yoji Ohashi, Fucyu (JP)

(73) Assignee: FUJITSU LIMITED, Kawasaki (JP)

( * ) Notice: Subject to any disclaimer, the term of this patent is extended or adjusted under 35 U.S.C. 154(b) by 322 days.

(21) Appl. No.: 14/755,917

(22) Filed: Jun. 30, 2015

(65) Prior Publication Data

US 2016/0003934 A1 Jan. 7, 2016

(30) Foreign Application Priority Data

Jul. 3, 2014 (JP) ................................. 2014-137965

(51) Int. Cl.
*G01S 13/02* (2006.01)
*G01S 7/03* (2006.01)
(Continued)

(52) U.S. Cl.
CPC ............ *G01S 7/03* (2013.01); *G01S 13/0209* (2013.01); *H01P 1/162* (2013.01); *H01P 3/16* (2013.01); *H01P 5/028* (2013.01)

(58) Field of Classification Search
CPC ........ G01S 13/0209; G01S 7/03; H01P 1/162; H01P 3/16; H01P 5/028
(Continued)

(56) References Cited

U.S. PATENT DOCUMENTS 4,929,959 A 5/1990 Sorbello et al.
6,229,484 B1 5/2001 Sagisaka
(Continued)

FOREIGN PATENT DOCUMENTS

JP 2000-252712 A 9/2000
WO WO 2006/098054 A1 9/2006

OTHER PUBLICATIONS

Extended European Search Report of European Patent Application 15174285.5 dated Dec. 1, 2015.

*Primary Examiner* — Timothy A Brainard
(74) *Attorney, Agent, or Firm* — Arent Fox LLP

(57) ABSTRACT

A stacked-waveguide substrate includes: a body configured to include a first dielectric-substrate, a second dielectric-substrate, and a third dielectric-substrate which are stacked in this order; a first conductor-pattern configured to be formed on a bottom surface of the first dielectric-substrate; a second conductor-pattern configured to be formed on a top surface of the third dielectric-substrate in a position corresponding to the first conductor-pattern; a first conductor-film configured to be located at an interface between the first dielectric-substrate and the second dielectric-substrate, and to have a first opening which faces the first conductor-pattern; a second conductor-film configured to be located at an interface between the second dielectric-substrate and the third dielectric-substrate, and to have a second opening which faces the second conductor-pattern; a first wiring line configured to cross the first opening to the first conductor-pattern; and a second wiring line configured to cross the second opening to the second conductor-pattern.

7 Claims, 11 Drawing Sheets

(51) Int. Cl.
*H01P 1/162* (2006.01)
*H01P 5/02* (2006.01)
*H01P 3/16* (2006.01)

(58) Field of Classification Search
USPC .......................................... 342/21; 333/208
See application file for complete search history.

(56) References Cited

U.S. PATENT DOCUMENTS

| | | |
|---|---|---|
| 2005/0073460 A1 | 4/2005 | Schmidt et al. |
| 2005/0285773 A1 | 12/2005 | Hartzstein et al. |
| 2007/0229380 A1 | 10/2007 | Oota et al. |
| 2008/0303721 A1 | 12/2008 | Oota et al. |
| 2013/0057365 A1* | 3/2013 | Mizushima ............. H01P 1/047 333/238 |

* cited by examiner

Br = Sh/b = 0.0 (Sh = 0.0 mm)

Br = Sh/b = 0.4 (Sh = 0.54 mm)

Br = Sh/b = 0.6 (Sh = 0.81 mm)

FIG. 7A
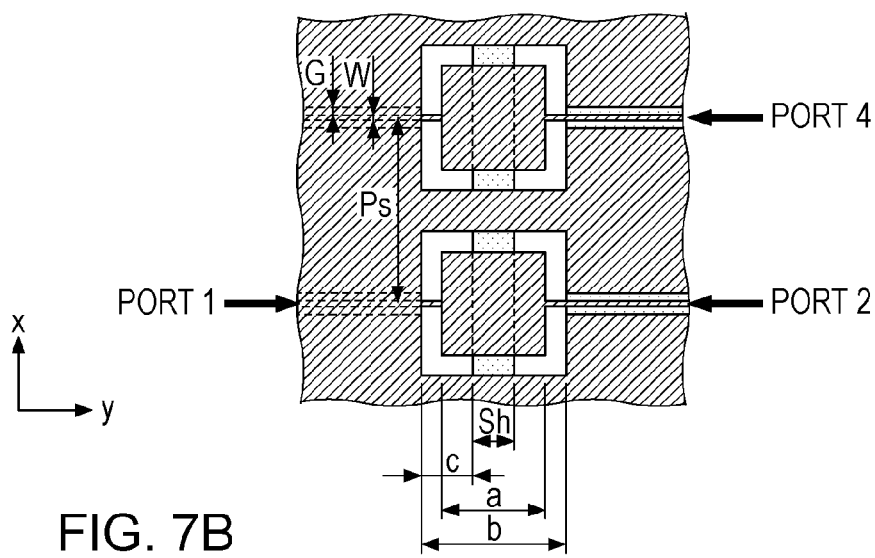
FIG. 7B
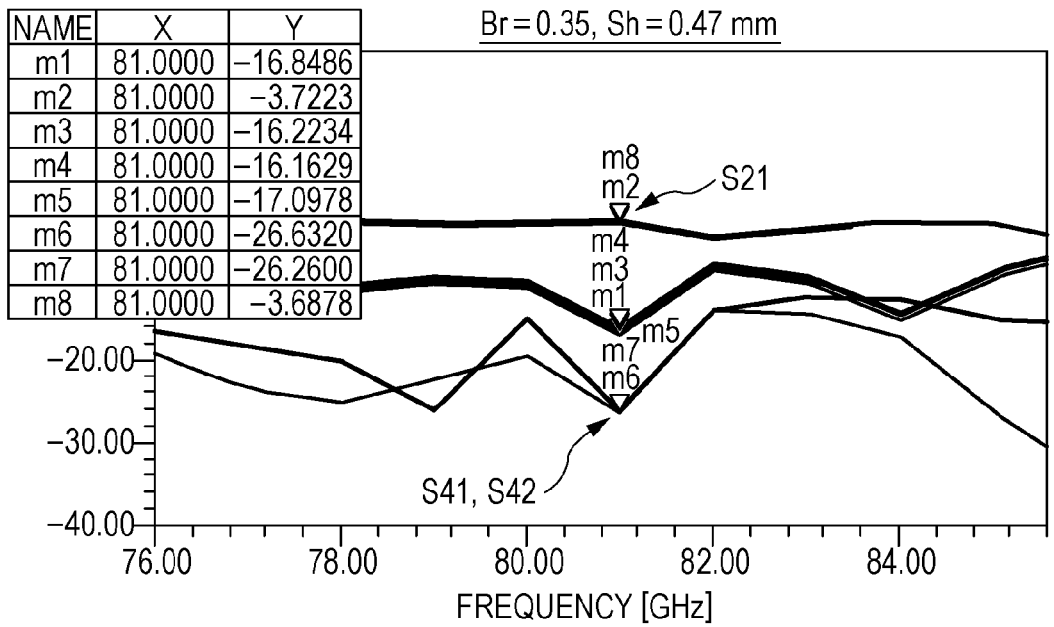
FIG. 7C
| Br | 0.35 |
|---|---|
| F1 (GHz) | 81 |
| S11 | −16.8 |
| S21 | −3.7 |
| S41 | −26.6 |
| S42 | −26.3 |

FIG. 9A
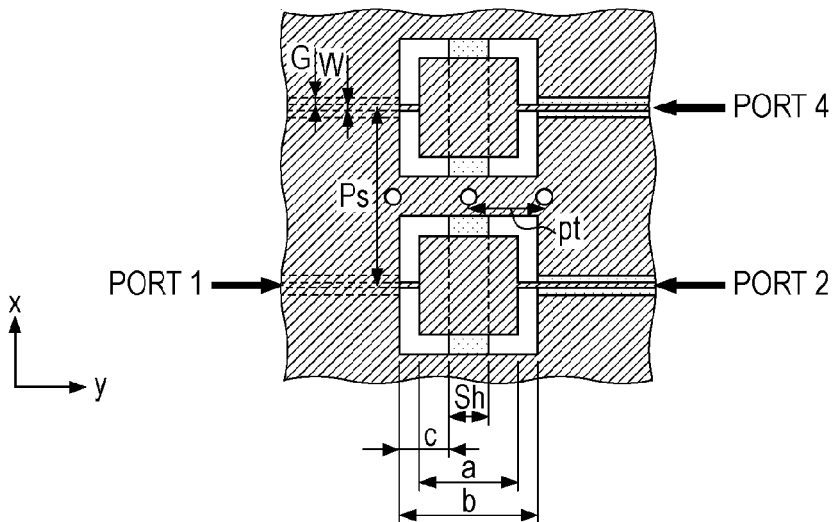
FIG. 9B
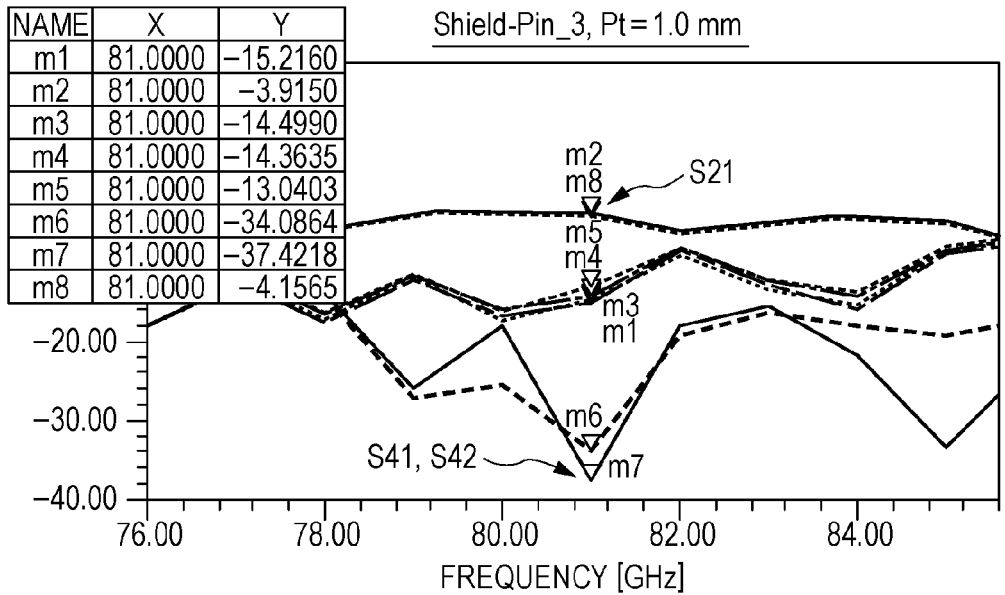
FIG. 9C
| PIN/Pt (mm) | 1/0.0 | 3/1.0 |
|---|---|---|
| F1 (GHz) | 81 | 81 |
| S11 | −16.2 | −15.2 |
| S21 | −4.0 | −3.9 |
| S41 | −32.5 | −34.1 |
| S42 | −29.6 | −37.4 |

STACKED WAVEGUIDE SUBSTRATE, RADIO COMMUNICATION MODULE, AND RADAR SYSTEM

CROSS-REFERENCE TO RELATED APPLICATION

This application is based upon and claims the benefit of priority of the prior Japanese Patent Application No. 2014-137965, filed on Jul. 3, 2014, the entire contents of which are incorporated herein by reference.

FIELD

The embodiments discussed herein are related to a stacked waveguide substrate, a radio communication module, and a radar system.

BACKGROUND

Radar apparatuses for collision avoidance are widely used particularly for luxury vehicles; however, costs and manufacturing hours are to be reduced in order to expand the use of radar to a number of vehicles. As an existing radar apparatus, a planar antenna module that integrates an antenna substrate and an integrated circuit (IC) substrate is available (see Japanese Patent No. 4803172 (International Publication Pamphlet No. WO 2006/098054), for example). In this module, a metal plate (made of aluminum or the like) having cavity waveguides formed therein is sandwiched between the antenna substrate and the IC substrate so that the IC substrate, the metal plate, and the antenna substrate are stacked, and through-transmission (transmission in the thickness direction of the substrates) is performed via waveguide transitions. This structure is simplified and illustrated in FIGS. 1A and 1B. FIG. 1A is a perspective view, and FIG. 1B is a cross-sectional view taken along line IB-IB of FIG. 1A.

By connecting a patch antenna (radiating element) 111 formed close to an IC substrate 101 to a patch antenna (radiating element) 113 formed close to an antenna substrate 103 via a waveguide 112 that passes through an aluminum plate 102, through-transmission of millimeter waves of about 60 to 76 GHz from a monolithic microwave (MM) IC to an antenna unit is performed. The waveguide 112 is used, and therefore, it is possible to perform through-transmission with a good isolation characteristic even if a plurality of radiating elements are disposed adjacent to one another.

However, even the simplified structure illustrated in FIGS. 1A and 1B uses two dielectric substrates and one aluminum plate, and alignment to be performed at the time of assembly is an obstacle to cost reduction. Furthermore, through-transmission is performed via waveguide transitions, which has a shortcoming, such as a large transmission loss. In the configuration illustrated in FIGS. 1A and 1B, in a case where the radiating elements 111 and 113 have dimensions of 1.0 mm×1.8 mm and the waveguide 112 has dimensions of 1.8 mm×3.4 mm×4.2 mm, for example, the transmission loss at 80 GHz is −5.2 dB. Therefore, a through-transmission technique using only dielectric substrates with a smaller transmission loss is anticipated.

Other related art is available in which a high-frequency line conductor is disposed in a position facing an electrode film, and an end portion of the line conductor is disposed so as to face a slot (opening) formed on the electrode film to thereby electromagnetically couple electromagnetic waves that propagate through the line conductor to a dielectric waveguide line disposed below (see Japanese Patent No. 3517148 (Japanese Laid-Open Patent Publication No. 2000-252712), for example). In this configuration, a group of sidewall through conductors (hereinafter referred to as "shield pins") are disposed in a dielectric to thereby block electromagnetic waves and suppress the spread of an electric field. However, in order to attain a desired isolation characteristic, the shield pins have to be disposed at a certain interval in all regions where through-transmission is performed. In a typical substrate manufacturing method, shield pins are formed by drilling and inserting electrodes while performing alignment, after forming a stacked substrate, and therefore, costs increase as the number of shield pins increases.

The embodiments provide a stacked waveguide substrate excellent in transmission loss and isolation characteristics with a simple and low-cost configuration.

SUMMARY

According to an aspect of the invention, a stacked waveguide substrate includes: a stacked body configured to include a first dielectric substrate, a second dielectric substrate, and a third dielectric substrate which are stacked in this order; a first conductor pattern configured to be formed on a bottom surface of the first dielectric substrate; a second conductor pattern configured to be formed on a top surface of the third dielectric substrate in a position corresponding to the first conductor pattern; a first conductor film configured to be located at an interface between the first dielectric substrate and the second dielectric substrate, and to have a first opening which faces the first conductor pattern; a second conductor film configured to be located at an interface between the second dielectric substrate and the third dielectric substrate, and to have a second opening which faces the second conductor pattern; a first wiring line configured to cross the first opening of the first conductor pattern in a direction orthogonal to a signal propagation direction in the first conductor pattern; and a second wiring line configured to cross the second opening of the second conductor pattern in a direction orthogonal to a signal propagation direction in the second conductor pattern, wherein the first opening is divided into a first slot and a second slot by the first wiring line, end portions of the first conductor pattern in the signal propagation direction are respectively present in the first slot and in the second slot of the first opening, the second opening is divided into a first slot and a second slot by the second wiring line, and end portions of the second conductor pattern in the signal propagation direction are respectively present in the first slot and in the second slot of the second opening.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4A is a top view of FIG. 3A and FIG. 4B is a cross-sectional view taken along line IVB-IVB of FIG. 4A;

FIGS. 7A, 7B, and 7C are diagrams illustrating characteristics of the stacked waveguide substrate according to the first embodiment;

FIGS. 9A, 9B, and 9C are diagrams illustrating characteristics of the stacked waveguide substrate according to the second embodiment;

DESCRIPTION OF EMBODIMENTS

Figure 1A:
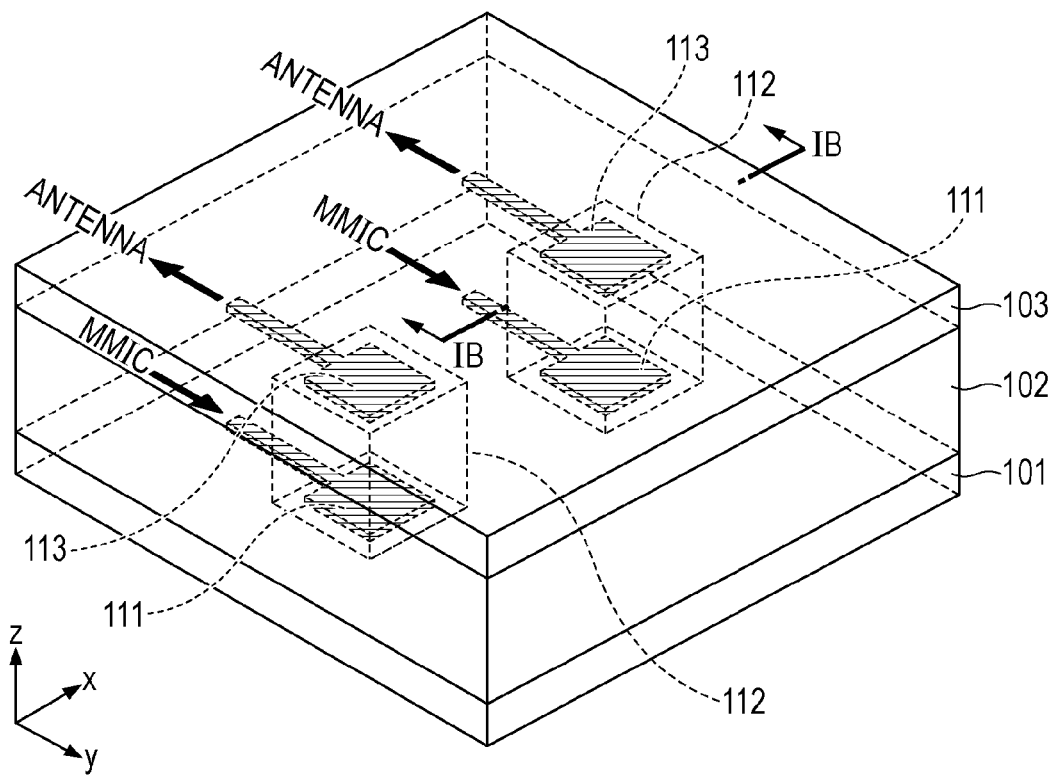
FIGS. 1A and 1B are diagrams illustrating an example of a configuration of a stacked antenna module in the related art.
Figure 1B:
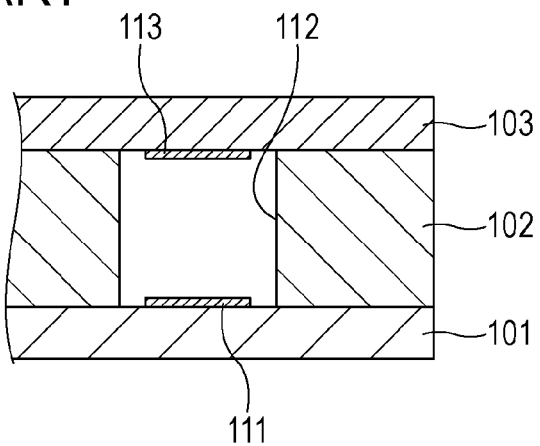

Before describing embodiments, a configuration conceivable in the process of developing the embodiments is described. In a case where the stacked structure illustrated in FIGS. 1A and 1B is replaced by a single dielectric substrate, the patch patterns (radiating elements) 111 and 113 are formed directly on the top surface and the bottom surface of the dielectric substrate. In this case, a cavity waveguide formed in metal, such as aluminum, is not provided, and electric fields radiated from the patch patterns 111 and 113 spread unlimitedly. Therefore, the isolation characteristics of the antennas are degraded, and the transmission loss becomes larger.

Figure 2A:
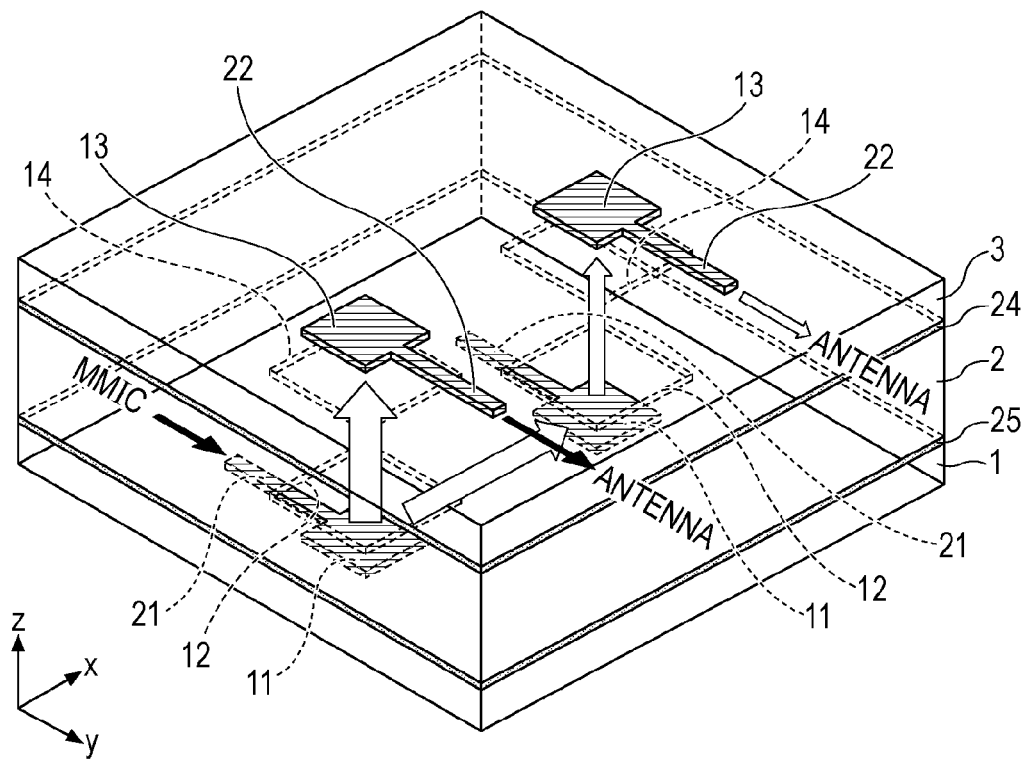
FIGS. 2A and 2B are diagrams illustrating a configuration of a stacked waveguide substrate conceivable in the process of developing embodiments.
Figure 2B:
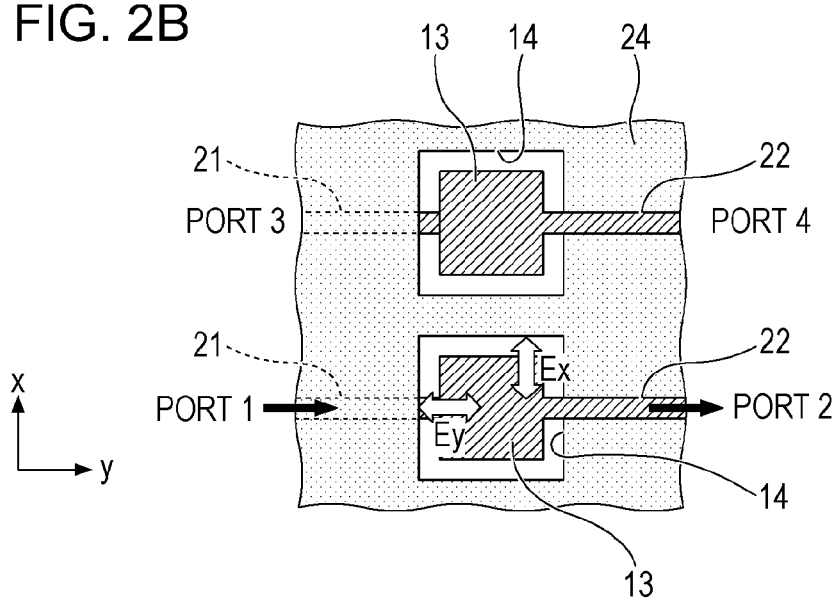

The next possible configuration is illustrated in FIGS. 2A and 2B in which conductor films 25 and 24, on which openings 12 and 14 that face patch patterns 11 and 13 are formed respectively, are disposed. In this configuration, dielectric substrates 1, 2, and 3 are stacked in this order, the patch patterns 11 are formed on the bottom surface of the dielectric substrate 1, and the patch patterns 13 are formed on the top surface of the dielectric substrate 3. A signal from an MMIC propagates through a transmission line 21 and is radiated from the patch pattern 11. The radiated electric field passes through the opening 12, the dielectric substrate 2, and the opening 14, is electromagnetically coupled to the patch pattern 13, and is output to an antenna unit through a transmission line 22. By disposing the conductor film 24 having the openings 14 and the conductor film 25 having the openings 12, it is possible to suppress the spread of the electric field to some extent. However, it is found that a target isolation characteristic is not attained.

The goal is to decrease the transmission loss so as to attain a value of −5 dB or higher and to attain an isolation characteristic of −25 dB or lower for a veguide that transmits high-frequency waves of tens of gigahertz or higher, millimeter waves (30 to 300 GHz), terahertz waves, and so on. The transmission loss (S21) is represented as the ratio of the energy of a transmission signal output from a port 2 to that of an incoming signal input into a port 1. The isolation characteristic is represented by using the ratio (S41) of the energy of a transmission signal output from a port 4 to that of an incoming signal input into the port 1, or the ratio (S42) of output from the port 4 to output from the port 2. The transmission loss becomes smaller as the value of S21 increases, and the isolation characteristic becomes better as the value of S41 or S42 decreases.

It is not possible to attain the target isolation characteristic with the configuration illustrated in FIGS. 2A and 2B because electric fields Ex respectively spread on planes parallel to the patch patterns 11 and 13 in a direction (x direction in FIGS. 2A and 2B) orthogonal to the propagation direction. On the other hand, electric fields Ey respectively generated at both ends of the patch patterns 11 and 13 in the propagation direction (y direction in FIGS. 2A and 2B) are mainly responsible for through-transmission in the z direction, and therefore, the transmission loss is suppressed.

The electric field Ex easily propagates to other adjacent patch patterns (radiating elements) in the x direction, which causes isolation degradation. Therefore, a configuration is proposed which suppresses the electric field Ex extending on the plane parallel to the patch pattern in the direction orthogonal to the propagation direction.

First Embodiment

Figure 3A:
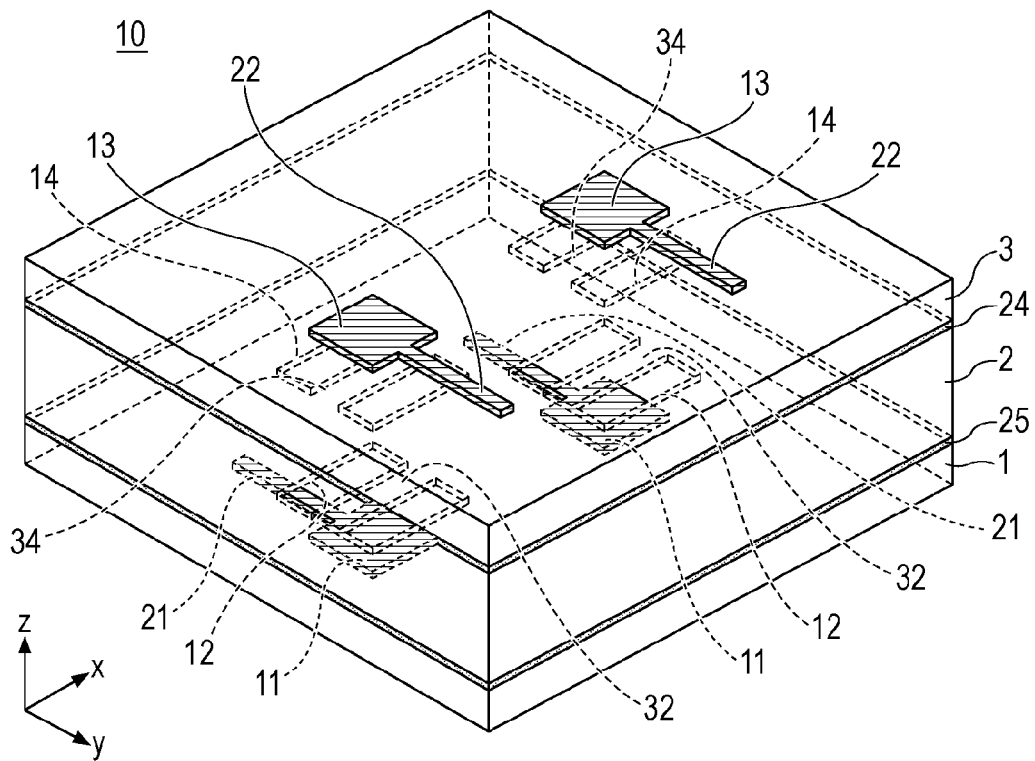
FIGS. 3A and 3B are diagrams illustrating a configuration of a stacked waveguide substrate according to a first embodiment.
Figure 3B:
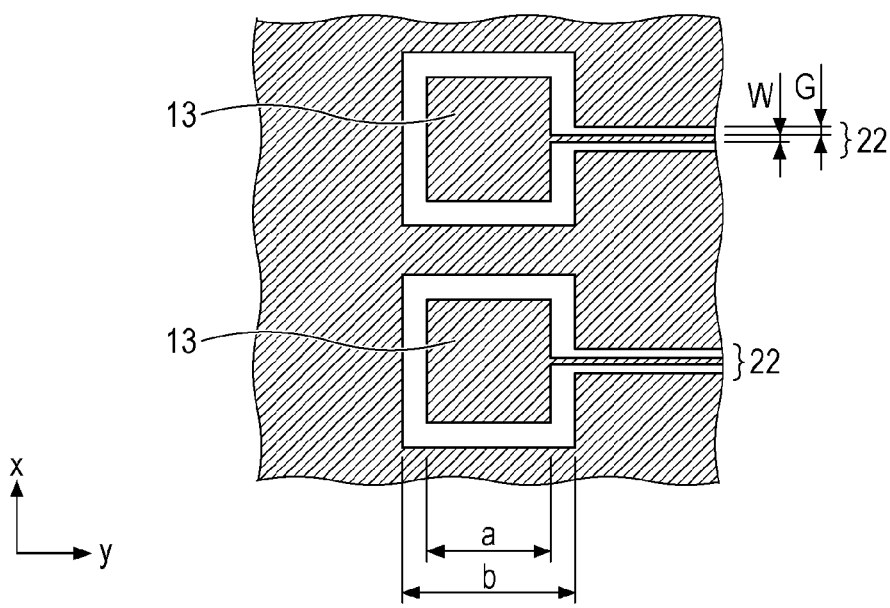
Figure 4A:
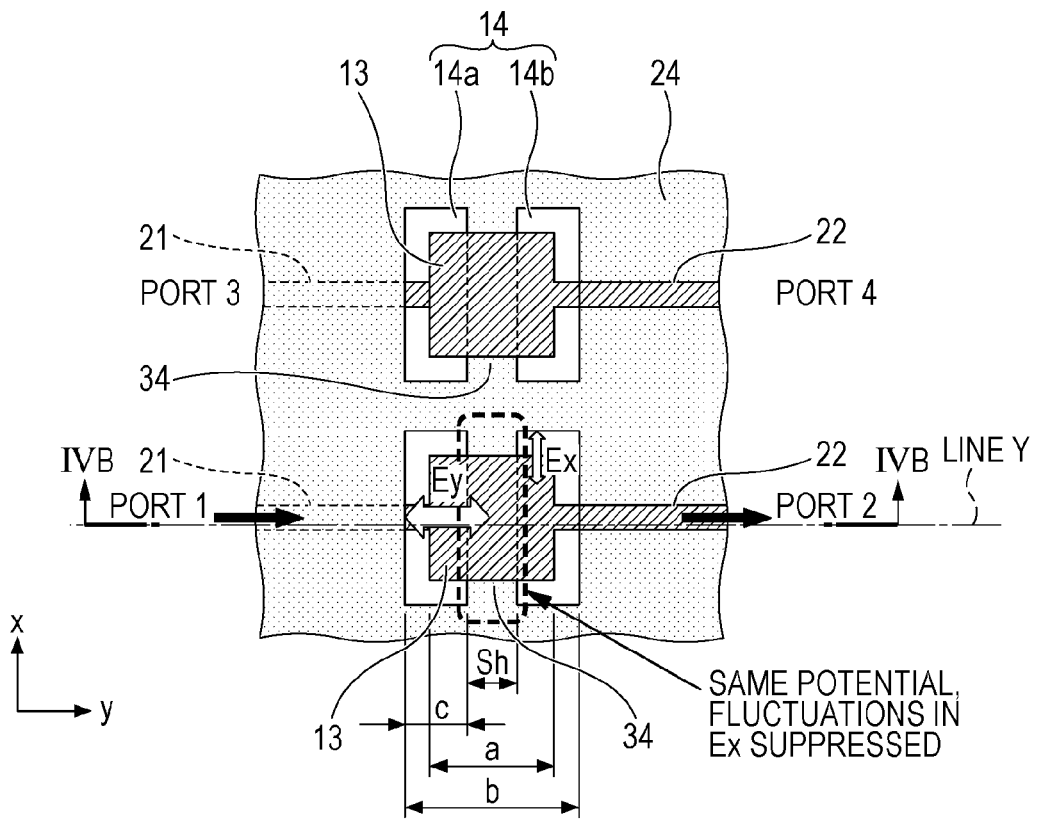
FIGS. 4A and 4B are diagrams illustrating a configuration of the stacked waveguide substrate according to the first embodiment, where
Figure 4B:
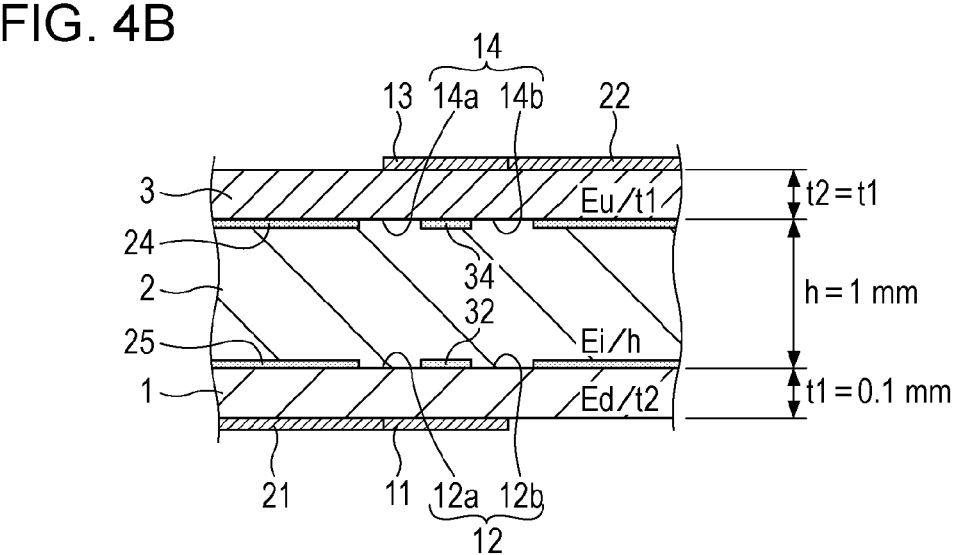

A configuration of a stacked waveguide substrate 10 is schematically illustrated in FIGS. 3A and 3B and FIGS. 4A and 4B. FIG. 3A is a perspective view of the stacked waveguide substrate 10, and FIG. 3B is a top view illustrating an example of conductor patterns in a case where coplanar lines are used as transmission lines. FIG. 4A is a top view of the configuration in FIG. 3A, and FIG. 4B is a cross-sectional view taken along line IVB-IVB of FIG. 4A.

The stacked waveguide substrate 10 is a stacked body including a first dielectric substrate 1 having the bottom surface on which the patch patterns 11 are formed, a second dielectric substrate 2, and a third dielectric substrate 3 having the top surface on which the patch patterns 13 are formed, these substrates being stacked in this order. To the patch pattern 11, the transmission line 21 is connected via which signal transmission with an MMIC not illustrated is performed. To the patch pattern 13, the transmission line 22 is connected via which signal transmission with an antenna unit not illustrated is performed. The transmission lines 21 and 22 may be microstrip lines as illustrated in FIG. 3A or may be coplanar lines as illustrated in FIG. 3B. In transmission characteristics evaluation described below, evaluation based on the configuration using coplanar lines is performed.

FIG. 3A illustrates only part of the transmission lines 21 and part of the transmission lines 22 for convenience of illustration. Although it is assumed that the first dielectric substrate 1 is an MMIC substrate and that the third dielectric substrate 3 is an antenna substrate for convenience of description, this assumption may be reversed.

At the interface between the first dielectric substrate 1 and the second dielectric substrate 2, the conductor film 25 having the openings 12 is disposed. In this example, the conductor film 25 having the openings 12 is formed on a surface of the first dielectric substrate 1 opposite to the patch patterns 11; however, the conductor film 25 may be formed on the side of the second dielectric substrate 2. Similarly, the conductor film 24 having the openings 14 is formed at the interface between the second dielectric substrate 2 and the third dielectric substrate 3. In this example, the conductor film 24 having the openings 14 is formed on a surface of the third dielectric substrate 3 opposite to the patch patterns 13; however, the conductor film 24 may be formed on the side of the second dielectric substrate 2.

A blocking wiring line 32 is formed so as to cross the opening 12 in the x direction, and the opening 12 is divided into a first slot 12a and a second slot 12b by the blocking wiring line 32. A blocking wiring line 34 is formed so as to cross the opening 14 in the x direction, and the opening 14 is divided into a first slot 14a and a second slot 14b by the blocking wiring line 34. Note that, for convenience of description, the openings 12 and 14 respectively refer to regions encompassing the entire projection regions of the patch patterns 11 and 13 in a case where the blocking wiring lines 32 and 34 are not formed as in FIGS. 2A and 2B.

The blocking wire lines 32 and 34 fix the electric fields Ex respectively extending on the planes parallel to the patch patterns 11 and 13 in the direction orthogonal to the propagation direction (y direction). The blocking wiring line 32 has the same potential in the x direction, and therefore, fluctuations in the electric field EX are suppressed at the interface between the first dielectric substrate 1 and the second dielectric substrate 2 and in the vicinity of the interface. Similarly, the blocking wiring line 34 has the same potential in the x direction, and therefore, fluctuations in the electric field EX are suppressed at the interface between the second dielectric substrate 2 and the third dielectric substrate 3 and in the vicinity of the interface.

On the other hand, it is sufficient that the electric fields Ey in the propagation direction have an intensity of 0 V/m at the centers of the patch patterns 11 and 13 and have a maximum intensity at both ends of the patch patterns 11 and 13 in the propagation direction. Therefore, the blocking wiring lines 32 and 34 do not greatly restrict the electric fields Ey that are generated at both ends of the patch patterns 11 and 13 in the y direction respectively as long as the blocking wiring lines 32 and 34 are respectively disposed so as to cross the patch patterns 11 and 13 in center portions thereof in the x direction.

As illustrated in FIG. 4A, the size of the openings 12 and 14 in the propagation direction respectively formed on the conductor films 25 and 24 is denoted by b, and the width of the blocking wiring lines 32 and 34 (that is, the size in the propagation direction) is denoted by Sh. Then, by appropriately selecting the range of Sh, it is possible to maintain the electric field Ey that contributes to through-transmission and to effectively block the electric field Ex. The size b of the openings 12 and 14 in the propagation direction is set so that the size b is larger than the size a of the patch patterns 11 and 13 in the propagation direction and so that the projection regions of the patch patterns 11 and 13 are included within the openings 12 and 14 respectively. In the first embodiment, the patch patterns 11 and 13 and the openings 12 and 14 are formed so as to be square patterns; however, the patch patterns 11 and 13 and the openings 12 and 14 are not necessarily square and may be rectangular, hexagonal, polygonal, or round.

FIGS. 5A through 5D are diagrams illustrating suppression effects on the electric field Ex attained by disposing the blocking wiring lines 32 and 34. In a simulation, coplanar lines (G=0.2 mm, W=0.07 mm) equivalent to those illustrated in FIG. 3B are used; however, coplanar wiring patterns are not illustrated for ease of description.

The Ex suppression effect depends on the ratio (Sh/b) of the width Sh of the blocking wiring lines 32 and 34 to the size b of the openings 12 and 14 in the propagation direction. The ratio is denoted by Br (Br=Sh/b). The value of Br is changed, and the electric field Ex at the patch pattern 11 (or 13) is simulated. The value of Br is changed by leaving the size b unchanged while changing the width Sh of the blocking wiring line 32 (or 34) in a state where the center line of the patch pattern 11 (or 13) in the x direction is aligned with the center line of the blocking wiring line 32 (or 34) in the x direction. The simulation is performed by using HFSS from ANSYS Japan K.K., and the electromagnetic field is analyzed under the following conditions. The size a of the patch patterns 11 and 13 in the propagation direction is 0.95 mm ($\lambda/2$ at 81 GHz), the size b of the openings 12 and 14 in the propagation direction is 1.35 mm, the permittivity of the first dielectric substrate 1, the second dielectric substrate 2, and the third dielectric substrate 3 is 3.8 (tan $\delta$=0.005), the thickness t1 of the first dielectric substrate 1 is 0.1 mm, the thickness h of the second dielectric substrate 2 is 1 mm, the thickness t2 of the third dielectric substrate 3 is 0.1 mm, the transmission lines (coplanar lines) have a gap of 0.2 mm and a strip width of 0.07 mm, and the distance Ps between the adjacent transmission lines is 2 mm.

Figure 5A:
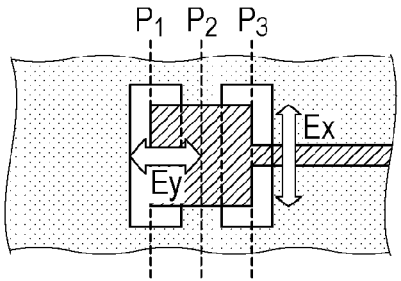
FIGS. 5A, 5B, 5C, and 5D are diagrams illustrating electric field suppression effects in a direction orthogonal to a propagation direction attained by using blocking wiring lines according to the first embodiment.
Figure 5B:
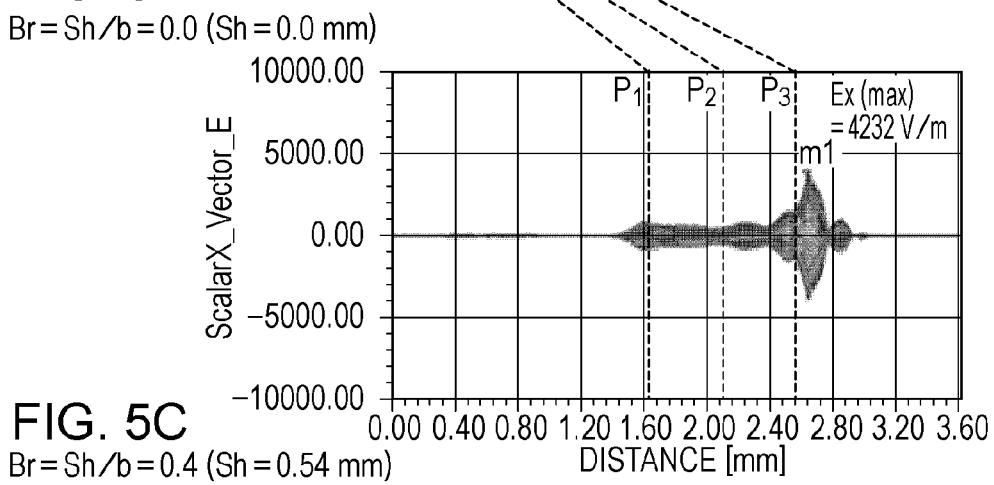
Figure 5C:
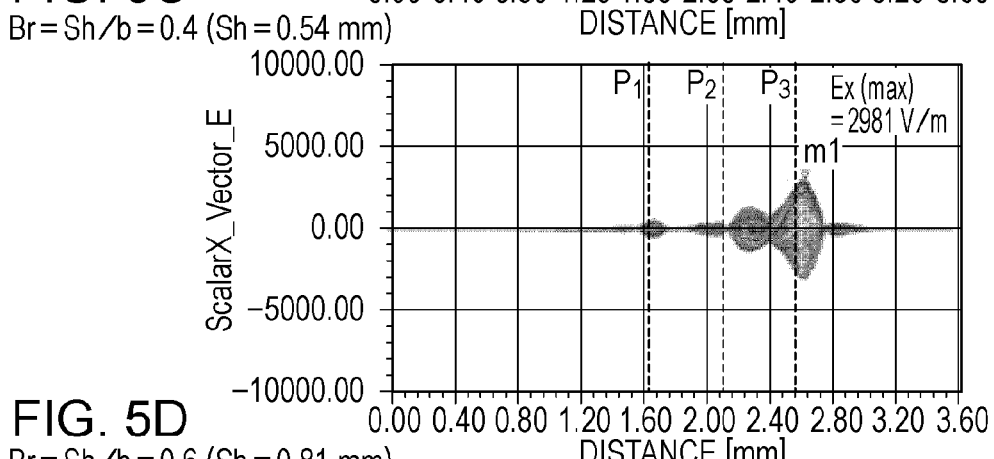
Figure 5D:
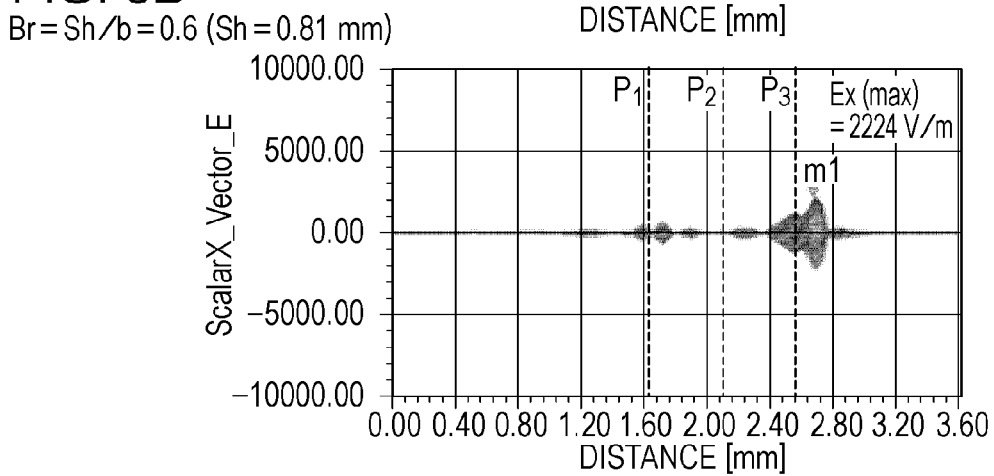

The points P1, P2, and P3 in FIGS. 5B through 5D correspond to one end P1 of the patch pattern in the propagation direction, the center position P2 of the patch pattern, and the other end P3 of the patch pattern in the propagation direction in FIG. 5A, respectively. FIG. 5B illustrates the magnitude of the electric field Ex in a case of Br=0, that is, in a case where the blocking wiring lines 32 and 34 are not provided. FIG. 5C illustrates the magnitude of the electric field Ex in a case of Br=0.4, that is, in a case of setting the width Sh of the blocking wiring lines 32 and 34 to a value equal to 40% of the size b of the openings 12 and 14 in the propagation direction and disposing the blocking wiring lines 32 and 34 in the centers of the openings 12 and 14 respectively. FIG. 5D illustrates the magnitude of the electric field Ex in a case of Br=0.6, that is, in a case of setting the width Sh of the blocking wiring lines 32 and 34 to a value equal to 60% of the size b of the openings 12 and 14 in the propagation direction and disposing the blocking wiring lines 32 and 34 in the centers of the openings 12 and 14 respectively.

It is found from the measurement results that the value decreases to Ex(max)=2981 V/m when Br=0.4 and to Ex(max)=2224 V/m when Br=0.6 compared to a case of Ex(max)=4232 V/m when Br=0. By providing the blocking wiring lines 32 and 34, it is possible to effectively suppress the electric fields Ex. However, the blocking wiring lines 32 and 34 do not shield the vicinity of each end portion of the patch patterns 11 and 13 in the propagation direction respectively in order to enable through-transmission.

Figure 6:
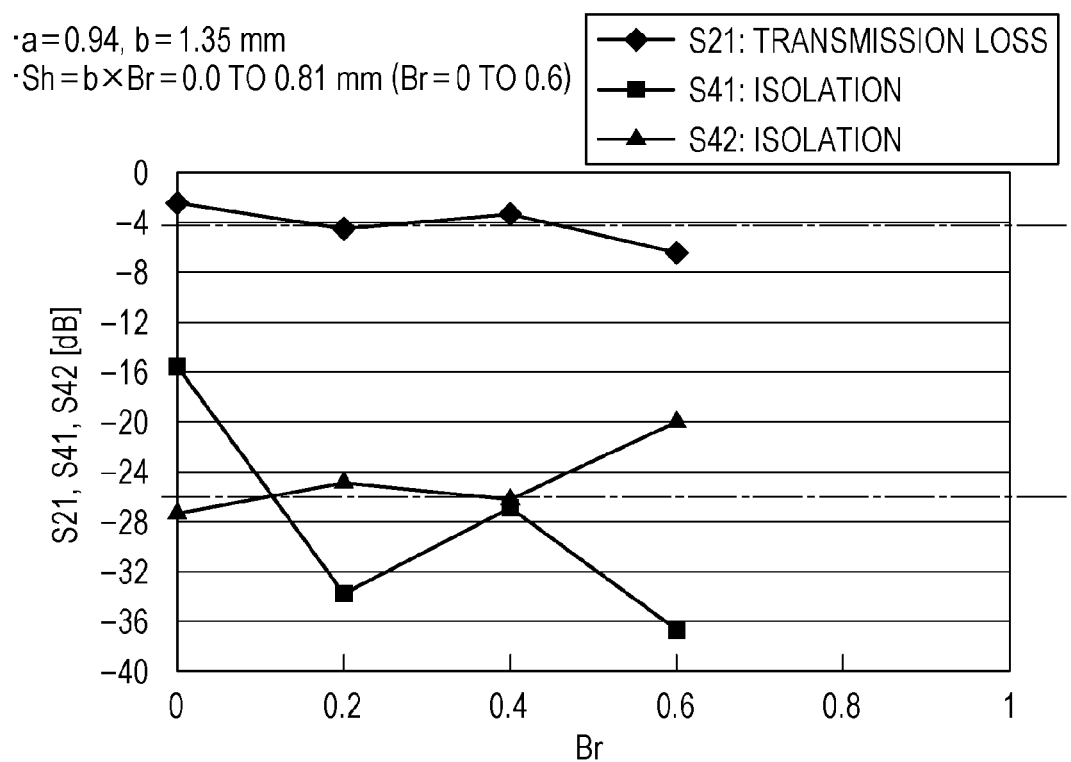
FIG. 6 is a diagram illustrating a relation between the ratio of the width of the blocking wiring lines to the size of openings, and the transmission loss and isolation characteristics.

FIG. 6 illustrates changes in the transmission loss (S21) and the isolation characteristics (S41 and S42) in a case of changing the width Sh of the blocking wiring lines 32 and 34. S41 is smaller than −25 dB in the range of 0.1≤Br≤0.6.

On the other hand, in a case where the width Sh of the blocking wiring lines 32 and 34 accounts for 60% of the size b of the openings 12 and 14 in the propagation direction (Br=0.6), the transmission loss S21 is degraded due to mismatching. In order to increase S21 to −5 dB or higher and to decrease S42 to −25 dB or lower, it is more preferable that the width Sh of the blocking wiring lines 32 and 34 have a value equal to 10 to 40% of the size b of the openings 12 and 14 in the propagation direction (0.1≤Br≤0.4). Here, it is possible to appropriately adjust the width Sh of the blocking wiring lines 32 and 34 by changing the size of the patch patterns 11 and 13 and the frequency that is used. The ratio Br is not requested to be in the range between the lower limit of 10% and the upper limit of 40% exactly, and good transmission characteristics and isolation characteristics are attained in a case where Br is within a range from around 10% to around 40%.

FIGS. 7A, 7B and 7C illustrate S parameters when Br=0.35 in the first embodiment. The size of the patch patterns 11 and 13 and the size of the openings 12 and 14 are the same as those set in the above-described simulation. The width Sh of the blocking wiring lines 32 and 34 is 0.47 mm. It is found from the graph that the transmission loss S21 is −3.7 dB, the isolation characteristic S41 is −26.6 dB, and the isolation characteristic S42 is −26.3 dB at the target frequency of 81 GHz and that transmission characteristics equivalent to or higher than the target values are attained.

The blocking wiring lines 32 and 34 may be formed simultaneously with formation of the first slot 12a, the second slot 12b, the first slot 14a, and the second slot 14b by using a photolithography method or the like when the conductor films 25 and 24 are formed for the first dielectric substrate 1 and for the third dielectric substrate 3 respectively. Therefore, it is possible to implement a stacked waveguide substrate excellent in the transmission loss and isolation characteristics for both high-frequency transmission signals and reception signals, with a simple and low-cost configuration.

Figure 8A:
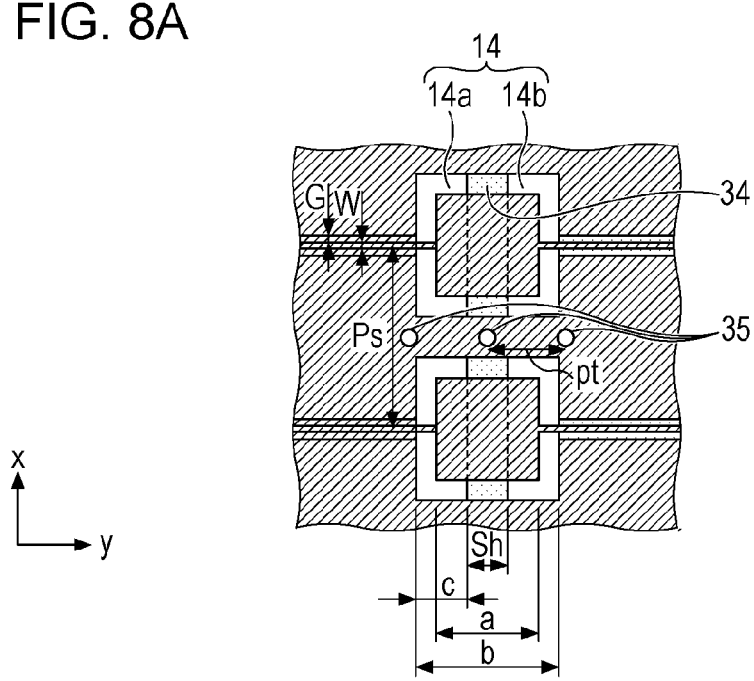
FIGS. 8A and 8B are diagrams illustrating a configuration of a stacked waveguide substrate according to a second embodiment.
Figure 8B:
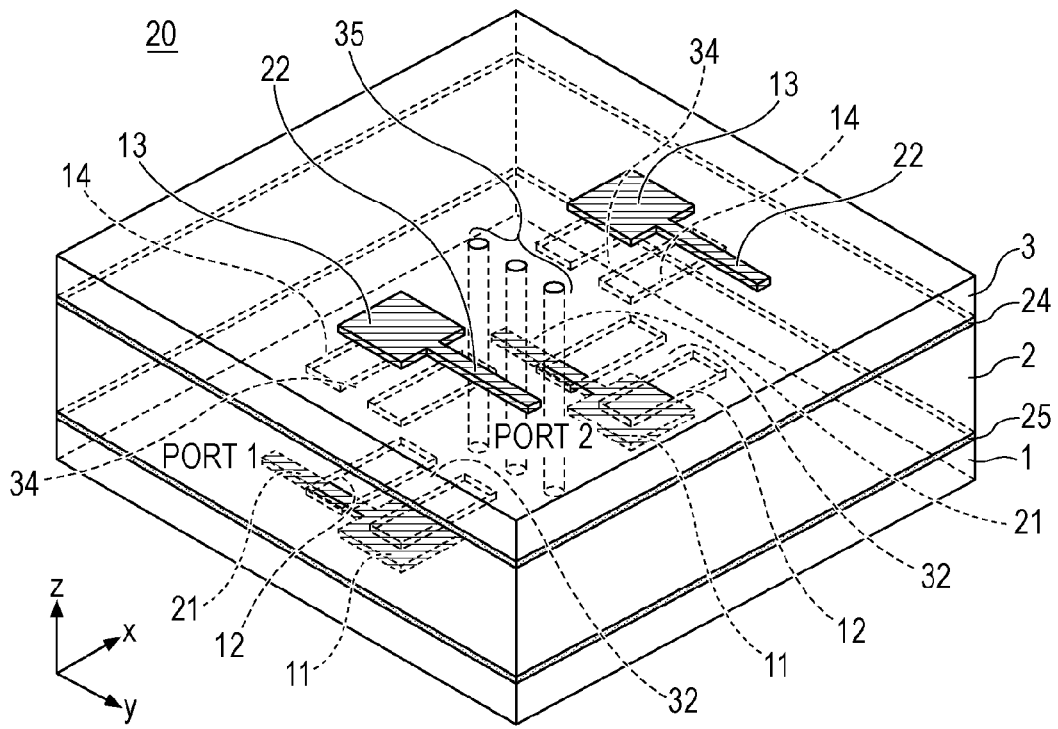

FIGS. 8A and 8B are schematic diagrams of a stacked waveguide substrate 20 according to a second embodiment. FIG. 8A is a top view, and FIG. 8B is a perspective view. In FIG. 8B, coplanar wiring patterns are not illustrated in order to simplify the description and illustration. In the second embodiment, shield pins 35 are disposed between the patch patterns (radiating elements) 13 adjacent to each other in the x direction. The shield pins 35 are disposed so as to pass through the first dielectric substrate 1, the second dielectric substrate 2, and the third dielectric substrate 3. It is desirable that the number of shield pins 35 inserted between the adjacent patch patterns 13 be small, namely, three or less, for example, from the viewpoint of reducing workloads for processing and alignment as much as possible.

The configuration of the stacked waveguide substrate 20 is the same as in the first embodiment except for the shield pins 35, and the sizes of the dielectric substrates and the patterns are the same as in the first embodiment. In the second embodiment, the width Sh of the blocking wiring lines 32 and 34 is set to 0.54 mm (the size b of the openings 12 and 14 in the propagation direction is 1.35 mm as in the first embodiment), and Br is set to 0.4.

FIGS. 9A, 9B and 9C illustrate the S parameters when Br=0.4 in the second embodiment. FIG. 9A illustrates a case where three shield pins 35 are disposed, and FIG. 9B illustrates the measurement result in this case. FIG. 9C illustrates the S parameters in a case of disposing only one shield pin 35 and those in the case of disposing three shield pins 35 for comparison. In the case of disposing only one shield pin 35, the shield pin 35 is disposed between the adjacent patch patterns 13 in the center portion in the propagation direction, for example. In the case of disposing three shield pins 35, the shield pins 35 are disposed between the adjacent patch patterns 13 along the propagation direction at an interval Pt. In this example, Pt is set to 1.0 mm. The distance Ps between the adjacent transmission lines is 2 mm as in the first embodiment.

As illustrated in FIGS. 9A, 9B and 9C, the isolation characteristic S41 of −34 dB or lower and the isolation characteristic S42 of −37 dB or lower are attained at the target frequency of 81 GHz in the case of disposing three shield pins 35. The electric field Ex that is to extend to the adjacent patch pattern 13 is blocked by the three shield pins 35, and the isolation characteristics are further improved compared to the first embodiment. The transmission loss of −3.9 dB is attained, which exceeds the target value.

It is possible to attain a sufficient isolation effect by using only one shield pin 35. The isolation characteristic S41 of −32.5 dB and the isolation characteristic S42 of −29.6 dB, both being equal to or lower than the target value, are attained by using one shield pin 35. The transmission loss S21 of −4.0 dB is attained, which also exceeds the target value.

Figure 10A:
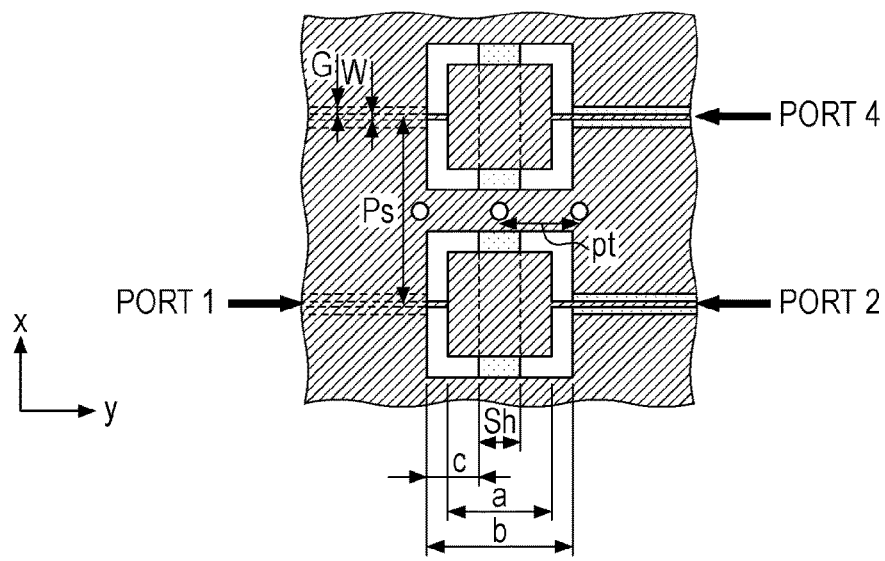
FIGS. 10A and 10B are diagrams illustrating a relation between the number of shield pins and an interval between disposed shield pins in the second embodiment.
Figure 10B:
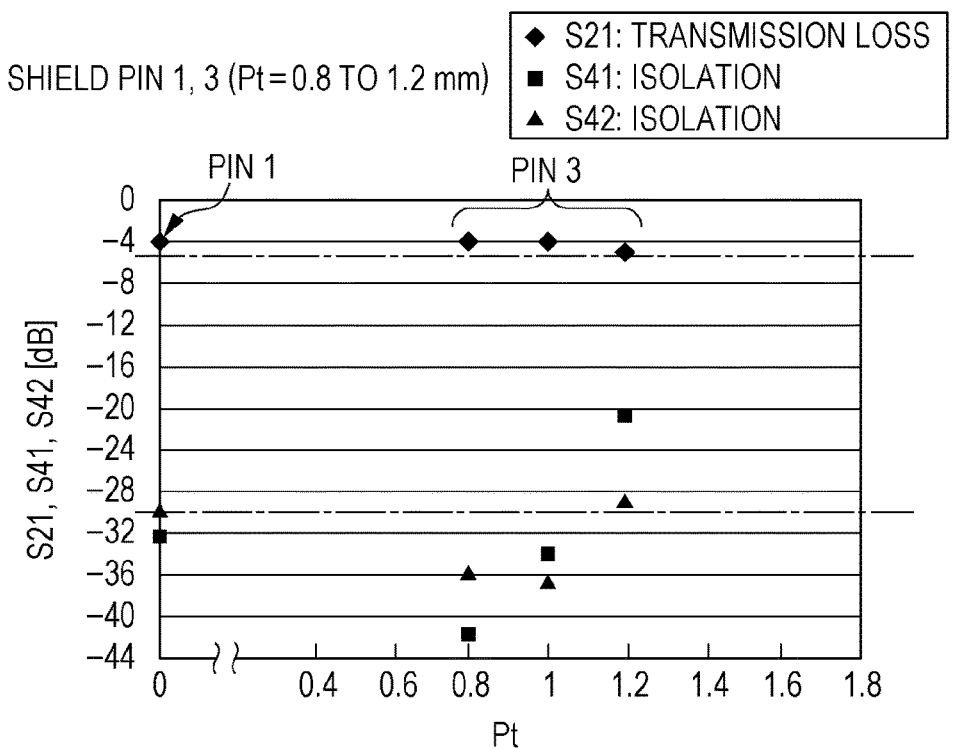

FIGS. 10A and 10B illustrate changes in the S parameters when the interval Pt between the shield pins 35 is changed in a range between 0.8 mm and 1.2 mm. The transmission loss S21 represented by diamond-shaped marks exceeds the target value (−5 dB) represented by a long-dashed short-dashed line in the case of one shield pin 35 and in the case of three shield pins 35. The isolation characteristic S41 represented by square marks and the isolation characteristic S42 represented by triangle marks are good in a case where the pin interval Pt is 1 mm or shorter; however, the isolation characteristic S41 is degraded in a case where the pin interval Pt is 1.2 mm. The half wavelength ($\lambda/2$) of a transmission signal having the frequency of 81 GHz within a substrate that has the permittivity of 3.8 is 0.95 mm, and it is desirable that the pin interval Pt be set to $\lambda/2$ or shorter in a case of disposing a plurality of shield pins 35. From the viewpoint of reducing the number of shield pins 35, it is more desirable that Pt be set to $2\lambda/5$ or longer and $\lambda/2$ or shorter.

With the configurations according to the first embodiment and the second embodiment, it is possible to implement through-transmission with characteristics equivalent to or higher than those attained by existing waveguides that are surrounded by metal, by using only dielectric substrates. A metal plate, such as an aluminum plate, is not used, and precise alignment does not have to be performed at the time of assembly if the configuration according to the first embodiment is employed.

In a case where high isolation characteristics are requested, it is sufficient to dispose one to three shield pins 35 between adjacent patch patterns (radiating elements) at an interval of $\lambda/2$ or shorter, and it is possible to improve isolation characteristics with a small number of shield pins 35.

System Configuration

Figure 11:
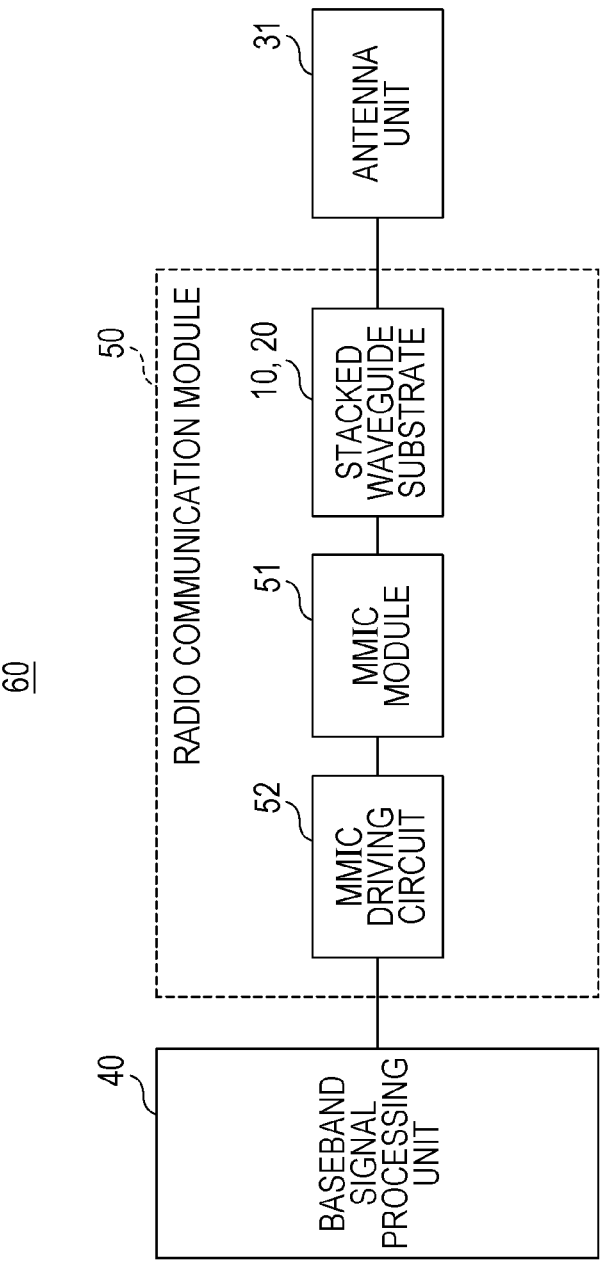
FIG. 11 is a schematic block diagram of a radio communication module to which the stacked waveguide substrate according to the embodiments is applied, and a radar system.

FIG. 11 is a schematic block diagram of a radio communication module 50 to which the stacked waveguide substrate 10 (or 20) according to the embodiments are applied, and a radar system 60 using the radio communication module 50. The radar system 60 includes an antenna unit 31, the radio communication module 50, and a baseband signal processing unit 40.

The radio communication module 50 includes the stacked waveguide substrate 10 according to the first embodiment or the stacked waveguide substrate 20 according to the second embodiment, an MMIC module 51 that is connected to the stacked waveguide substrate 10 (or 20) and that performs radio frontend processing, and an MMIC driving circuit 52 that drives the MMIC module 51. An amplifier, a mixer, an oscillator (voltage-controlled oscillator (VCO)), a multiplexer, and so on are integrated into the MMIC module 51, and the MMIC module 51 generates a high-frequency signal (radar wave) to be transmitted from the antenna unit 31 and extracts a difference in frequency between a reflection signal received by the antenna unit 31 and the transmitted high-frequency signal. The baseband signal processing unit 40 processes a low-frequency component according to the difference in frequency and takes certain information.

The stacked waveguide substrate 10 (or 20) of the radio communication module 50 exhibits good transmission loss and isolation characteristics with a simple configuration, and therefore, it is possible to reduce the size and cost of the radio communication module 50.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A stacked waveguide substrate, comprising:
    a stacked body configured to include a first dielectric substrate, a second dielectric substrate, and a third dielectric substrate which are stacked in this order;
    a first conductor pattern configured to be formed on a bottom surface of the first dielectric substrate;
    a second conductor pattern configured to be formed on a top surface of the third dielectric substrate in a position corresponding to the first conductor pattern;
    a first conductor film configured to be located at an interface between the first dielectric substrate and the second dielectric substrate, and to have a first opening which faces the first conductor pattern;
    a second conductor film configured to be located at an interface between the second dielectric substrate and the third dielectric substrate, and to have a second opening which faces the second conductor pattern;
    a first wiring line configured to cross the first opening of the first conductor pattern in a direction orthogonal to a signal propagation direction in the first conductor pattern; and
    a second wiring line configured to cross the second opening of the second conductor pattern in a direction orthogonal to a signal propagation direction in the second conductor pattern, wherein
    the first opening is divided into a first slot and a second slot by the first wiring line,
    end portions of the first conductor pattern in the signal propagation direction are respectively present in the first slot and in the second slot of the first opening,
    the second opening is divided into a first slot and a second slot by the second wiring line, and
    end portions of the second conductor pattern in the signal propagation direction are respectively present in the first slot and in the second slot of the second opening.

2. The stacked waveguide substrate according to claim 1, wherein
    when a size of the first opening along the signal propagation direction in the first conductor pattern and a size of the second opening along the signal propagation direction in the second conductor pattern are denoted by b, and a width of the first wiring line and a width of the second wiring line are denoted by Sh, then a ratio of Sh to b, which is denoted by Br, satisfies $0.1 \leq Br \leq 0.4$.

3. The stacked waveguide substrate according to claim 1, wherein
    a size of the first conductor pattern in the signal propagation direction and a size of the second conductor pattern in the signal propagation direction are set to one-half of a wavelength of a transmission signal, and
    the size of the first opening along the signal propagation direction in the first conductor pattern and the size of the second opening along the signal propagation direction in the second conductor pattern are larger than one-half the wavelength of the transmission signal.

4. The stacked waveguide substrate according to claim 1, further comprising:
    a third conductor pattern configured to be adjacent to the first conductor pattern in the direction orthogonal to the signal propagation direction in the first conductor pattern; and
    a fourth conductor pattern configured to be adjacent to the second conductor pattern in the direction orthogonal to the signal propagation direction in the second conductor pattern, wherein
    at least one shield pin is disposed between a pair of the first conductor pattern and the second conductor pattern and a pair of the third conductor pattern and the fourth conductor pattern.

5. The stacked waveguide substrate according to claim 4, wherein
    the at least one shield pin includes two or more shield pins, and the two or more shield pins are disposed at an interval equal to or less than one-half of the wavelength of the transmission signal.

6. A radio communication module, comprising:
    a stacked waveguide substrate that include:
        a stacked body configured to include a first dielectric substrate, a second dielectric substrate, and a third dielectric substrate which are stacked in this order,
        a first conductor pattern configured to be formed on a bottom surface of the first dielectric substrate,
        a second conductor pattern configured to be formed on a top surface of the third dielectric substrate in a position corresponding to the first conductor pattern,
        a first conductor film configured to be located at an interface between the first dielectric substrate and the second dielectric substrate, and to have a first opening which faces the first conductor pattern,
        a second conductor film configured to be located at an interface between the second dielectric substrate and the third dielectric substrate, and to have a second opening which faces the second conductor pattern,
        a first wiring line configured to cross the first opening of the first conductor pattern in a direction orthogonal to a signal propagation direction in the first conductor pattern, and
        a second wiring line configured to cross the second opening of the second conductor pattern in a direction orthogonal to a signal propagation direction in the second conductor pattern, wherein
        the first opening is divided into a first slot and a second slot by the first wiring line,
        end portions of the first conductor pattern in the signal propagation direction are respectively present in the first slot and in the second slot of the first opening,
        the second opening is divided into a first slot and a second slot by the second wiring line, and end portions of the second conductor pattern in the signal propagation direction are respectively present in the first slot and in the second slot of the second opening; and an integrated circuit configured to be connected to the stacked waveguide substrate and that performs radio frontend processing on a transmission signal and on a reception signal transmitted and received by the stacked waveguide substrate.

7. A radar system, comprising:

an antenna unit that transmits a radar wave and that receives a reflection wave corresponding to the radar wave;

the radio communication module according to claim 6 that performs radio frontend processing on the radar wave and on the reflection wave and that transmits to and receives from the antenna unit the radar wave and the reflection wave respectively; and a signal processing unit configured to be connected to the radio communication module and that performs baseband signal processing on the radar wave and on the reflection wave.

\* \* \* \* \*